(12) United States Patent
Shirk et al.

(10) Patent No.: US 8,719,127 B2
(45) Date of Patent: *May 6, 2014

(54) NETWORK COMMERCE SYSTEM WITH LEAD-BASED FEEDBACK

(75) Inventors: Valerie K. Shirk, San Jose, CA (US); Jason M. Heidema, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 1449 days.

This patent is subject to a terminal disclaimer.

(21) Appl. No.: 11/645,891

(22) Filed: Dec. 27, 2006

(65) Prior Publication Data

US 2008/0162203 A1 Jul. 3, 2008

(51) Int. Cl.
*G06Q 40/00* (2012.01)
(52) U.S. Cl.
USPC .......................................................... 705/35
(58) Field of Classification Search
USPC .......................... 705/53, 40, 44, 26, 27, 8, 35
See application file for complete search history.

(56) References Cited

U.S. PATENT DOCUMENTS

| | | | | |
|---|---|---|---|---|
| 5,237,499 A * | 8/1993 | Garback | ........................... | 705/5 |
| 6,457,005 B1 * | 9/2002 | Torrey | ............................... | 707/5 |
| 2002/0069093 A1 * | 6/2002 | Stanfield | ........................... | 705/5 |
| 2003/0069744 A1 * | 4/2003 | Craig et al. | ........................ | 705/1 |
| 2003/0083895 A1 * | 5/2003 | Wright et al. | ........................ | 705/1 |
| 2003/0167195 A1 * | 9/2003 | Fernandes et al. | ................. | 705/8 |
| 2003/0229900 A1 * | 12/2003 | Reisman | .......................... | 725/87 |
| 2004/0098287 A1 * | 5/2004 | Young et al. | ....................... | 705/5 |
| 2005/0038688 A1 * | 2/2005 | Collins et al. | ..................... | 705/9 |
| 2005/0171838 A1 * | 8/2005 | Eglinton | .......................... | 705/14 |
| 2006/0041500 A1 * | 2/2006 | Diana et al. | ..................... | 705/37 |
| 2006/0195352 A1 * | 8/2006 | Goldberg et al. | .................. | 705/9 |
| 2006/0195353 A1 * | 8/2006 | Goldberg et al. | ............... | 705/10 |
| 2007/0112582 A1 * | 5/2007 | Fenlon | .............................. | 705/1 |
| 2007/0156446 A1 * | 7/2007 | Jolly et al. | .......................... | 705/1 |
| 2010/0057556 A1 * | 3/2010 | Rousso et al. | .............. | 705/14.44 |

* cited by examiner

*Primary Examiner* — Behrang Badii
*Assistant Examiner* — Daniel L Greene
(74) *Attorney, Agent, or Firm* — Schwegman, Lundberg & Woessner, P.A.

(57) ABSTRACT

A network commerce system comprises a product sale listing searchable by a consumer and comprising one or more products provided by a third-party vendor in a pay-per-lead format. A pay-per-lead tracking module is operable to track consumer leads provided to the third-party vendor; and a feedback system enables at least one of the consumer and the third-party vendor to leave feedback regarding a lead tracked via the pay-per-lead tracking module.

24 Claims, 3 Drawing Sheets

NETWORK COMMERCE SYSTEM WITH LEAD-BASED FEEDBACK

TECHNICAL FIELD

The present application relates generally to data-processing, and more specifically in one example to a transactional system with lead-based feedback.

BACKGROUND

The Internet and other networks such as cellular phone networks have enabled consumers to shop and compare prices, services, and products through a variety of sources. Consumers can use their computers or other network devices to visit a variety of network commerce providers such as websites, and can research and purchase items more quickly than it may typically take to drive to a shopping mall.

Some websites specialize in certain products, such as websites that sell only electronics or network commerce providers that sell only books, while others sell a wider variety of items. Not all websites are simply commercial sales businesses; other sales formats such as classified ad listings or auctions have become popular, including perhaps the best-known auction website, eBay™. Because auction websites such as eBay™ typically involve transactions between individual consumers and not well-known or trusted retailers, various feedback mechanisms enabling auction sellers and buyers to provide feedback regarding transactions are often provided. In one such example, the bidding and purchasing process is guided by the auction website or other network commerce system, and feedback can be left as a part of the purchasing process.

The listings at auction sites may not always include all products that sellers seek to find, and so sometimes include fixed price listings provided by third party retailers or other parties. These fixed price listings can provide a buying opportunity for consumers visiting the auction site when no suitable products are available for auction, or can provide a greater number of products than are available for auction when an item is in high demand. The variety of products available is typically also enhanced, and availability is not dependent on the term of an auction. In some examples, the selected product is bought directly from the third party provider using the vendor's own purchasing systems such as credit card online payment, or other purchasing transaction systems used for other retail purchases. In other examples, the seller advertises a service, such as installation, repair, wedding photography, or other such services.

But, certain challenges may exist for network commerce providers and for consumers relating to the quality of service provided by these third party vendors or fixed-price sales conducted outside the auction process in an auction environment. Because the transaction isn't completed using the auction process, the various features and protections offered by the auction completion process such as payment escrow, feedback, and consumer protection mechanisms and dispute resolution processes are not provided as part of the transaction.

It is desired to better manage third-party vendor transactions in environments such as an auction website or other network commerce system.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the scope or extent of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

One example embodiment of the invention comprises a network commerce system, or a method or software for operating a network commerce system, comprising a feedback system for pay-per-lead third party vendors. A product sale listing searchable by a consumer is provided and comprises one or more products provided for sale by a third-party vendor in a pay-per-lead format. A pay-per-lead tracking module is operable to track consumer leads provided to the third-party vendor; and a feedback system enables at least one of the consumer and the third-party vendor to leave feedback regarding a lead tracked via the pay-per-lead tracking module.

In a more detailed example, the pay-per-lead tracking module is further operable to bill the third party vendor for tracked consumer leads. In other embodiments, the pay-per-lead tracking module tracks for sale advertisements that are not billed on a pay-per-lead basis. In another example, the pay-per-lead tracking module is operable to track qualified consumer leads, where qualified leads include some minimum level of communication between the consumer and the third party vendor. Further examples of a minimum level of communication include an e-mail message, a text message, a voice call, or a video call of at least a minimum size or duration.

In another example, feedback may be left only for qualified consumer leads. In further examples, feedback may be left only after a transaction resulting from the tracked lead has been completed, or only after a transaction resulting from the tracked lead results in a sale agreement.

Figure 1:
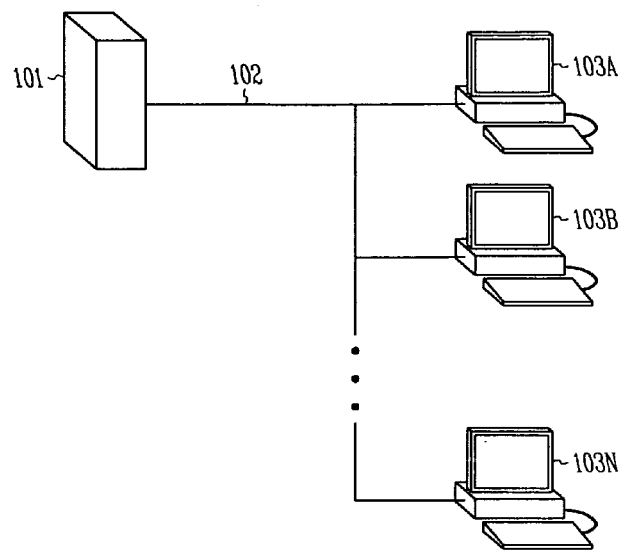
FIG. 1 is a block diagram of a network commerce system, as may be used to practice some embodiments of the invention.

FIG. 1 is a block diagram of a networked commerce system, as may be used to practice some embodiments of the invention. The commerce system in various embodiments comprises various combinations of hardware and software to provide functions and services such as those needed to facilitate commerce between parties on a network, such as an Internet auction website.

A network server 101 is coupled to a network 102. The network further couples various other computers 103a through 103*n* to the server. In some embodiments, the network includes other parts, such as routers, switches, and other computerized elements. Alternate embodiments include substitution of elements such as the computers 103 with other computerized devices, such as cell phones, PDAs, or set-top boxes.

The server in this example runs one or more software applications, which in alternate embodiments are run across two or more servers, to provide various network commerce functions. In one example, auction website software and related databases of items for sale are stored on the server, along with data related to the sellers of the items, registered purchasers, and details such as feedback regarding completed transactions.

In operation, a seller uses a remote computer such as 103*a-n* to post or list an item for sale, such as an item to be sold at auction or an item to be sold at a fixed price, or creates a sale item listing that refers a buyer to the seller's own website, store, or other place of commerce. The website is also available to prospective buyers, who can search and bid for items for sale, such as bidding on an auction, buying a fixed price item for sale, or following a link to an external vendor having a sale listing posted on the server 101.

The network commerce provider operates as a business by charging certain fees, such as for listing an item for sale, or for purchasing an item at auction. Because the terms of the transaction are typically set or negotiated through the network commerce system, the value of the transaction and the fees owed can be readily measured and charged to the appropriate parties. In instances where the item listed for sale is a reference to an external or third-party seller such that the transaction may be negotiated or completed on a website or via other mechanisms external to the network commerce service, alternate means of compensation for referring customers to the third-party vendors are sometimes provided.

In one such example, a third-party vendor provides a listing of an item or items for sale in a pay-per-lead format, such that the third-party vendor is willing to pay a certain amount for potential customer leads generated via the listing on the network commerce system. The leads are tracked and confirmed by a lead tracking module. The lead tracking module and other modules within the network commerce system are in various embodiments comprising software, hardware, user intervention or instruction, and various combinations thereof. In this example, the third-party vendor provides a list of items for sale, and agrees to pay the network commerce service provider a certain fee for each lead produced regarding one of the listed sale items.

In some further embodiments, the nature of the leads qualifying for payment is further defined, such as by requiring some minimum level of communication between the third-party vendor and the potential customer. For example, the customer may send an e-mail to the third-party vendor via an interface or e-mail system provided by the network commerce system provider, or may send a text message, voice message, or initiate an online teleconference with the vendor. In further examples, the customer uses a system provided by the network commerce system provider to initiate contact with the third-party vendor, such that the contact can be characterized or tracked by the network commerce provider.

In one such example, a teleconferencing service provided by or associated with the network commerce system is used to contact the third-party vendor, and characteristics of the teleconference are monitored to determine that the contact constitutes a qualified lead. For example, a voice over Internet protocol (VOIP) teleconference that is initiated but that is not received or that does not contain any content will not be recognized as a qualified lead in some embodiments. In other embodiments, the duration of the teleconference or videoconference must be a minimum length, such as five or ten seconds, for the lead to constitute a qualified lead. Similarly, where contact between a potential customer and a third-party vendor takes another form such as e-mail, the content, delivery, and length of the e-mail can be used to determine whether the lead is a qualified lead. For example, an e-mail message that has no content, or that contains fewer than ten characters, may be ignored and not considered a qualified lead. Similarly, an e-mail that can't be delivered, doesn't contain appropriate customer contact information, or that is from the same potential customer as another qualified lead can be ignored as a lead that is not qualified for payment on a pay-per-lead basis.

Figure 2:
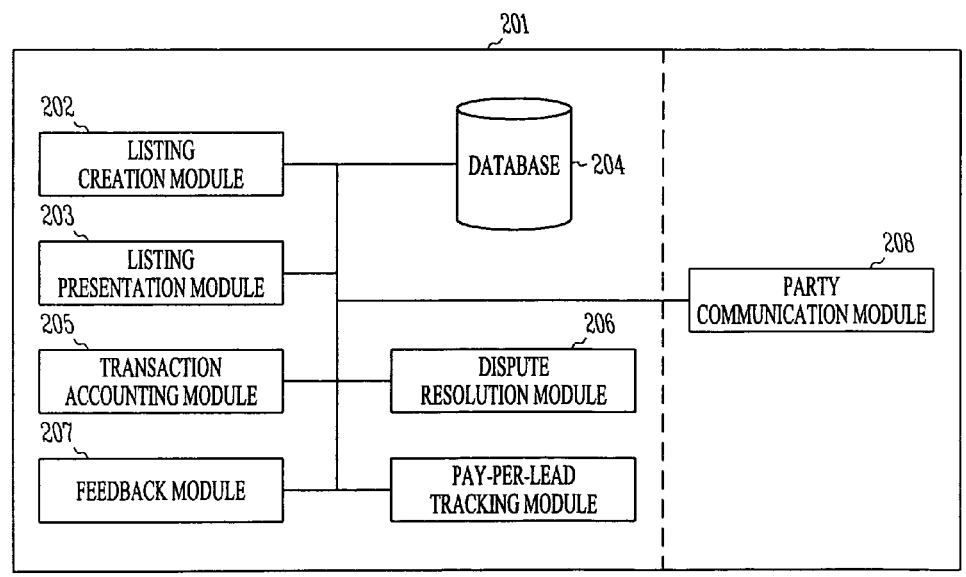
FIG. 2 is a block diagram of a network commerce system server, consistent with an example embodiment of the invention.

FIG. 2 is a more detailed block diagram of a network commerce system server, consistent with an example embodiment of the inventions. The various modules or elements shown in FIG. 2 need not be embodied in the same server or in a server, but exist in various combinations as hardware, software, user intervention or input, and externally provided information.

In this example, the server 201 comprises a listing creation module 202 and a listing presentation module 203, coupled to a database 204. The listing creation module 202 enables creation or submission of items for sale, and in various embodiments facilitates gathering data related to the item for sale, creation of a web page or other presentation regarding the item for sale, and provides various tools or functions for managing a particular seller's items for sale. The listing creation module 202 in some embodiments interfaces with external modules, such as an external automated listing generator. For sale listings generated by or received in the listing creation module are stored in the database 204, for retrieval and presentation by the listing presentation module 203.

The listing presentation module 203 enables a potential customer to browse or search the items for sale, such as browsing items in a particular category of items or searching for various keywords or characteristics of items for sale. The listings are provided in one example via a website, while in other embodiments they are provided in other format such as through a text message sent to a cell phone or an e-mail message sent in response to an inquiry.

When a customer identifies an item to bid on or to purchase and a transaction is initiated, the transaction is accounted in the transaction accounting module 305. In an auction, this records the winning bid price, shipping or other fees, and charges the appropriate party the appropriate fee for the transaction. The fee in one example is a percentage of the final bid price and is charged to the seller, but in other examples includes a fixed fee or a fee charged to the buyer as part of the purchase. In other examples, the customer may be selecting a product or a service, such as installation, repair, or some other such service, such as to collect quotes for a particular service to be performed. In some such cases, no product need actually be sold, as the customer may only be collecting quotes for such a service. Some systems will charge a fee for leads provided in this manner, such as charging a predetermined pay-per-lead fee to the service provider advertising through the commerce system.

Other aspects of the transaction are managed by other modules, such as the dispute resolution module 206, which manages resolution of disputes between parties involved in a transaction such as where a purchased product is not received, a customer fails to pay for a purchased product, or a purchased product received does not match the description of the product in the sale listing. The dispute resolution module facilitates gathering and exchanging information, as well as facilitating resolution or unwinding of a disputed transaction.

The feedback module 207 enables users to provide feedback regarding past transactions, such as when an auction winner completes a transaction and wishes to provide feedback regarding the seller's description of the item, packing and shipping the item, timeliness in handling the transaction, or quality of the item purchased. In other examples, the feedback module is used to provide feedback regarding services, quotes, negotiations, or other business associations between parties.

In one example embodiment of the invention, a party communication module 208 is also provided, which may or may not be a part of the computer systems under the network commerce system provider's control. The party communication module 208 enables communication between various parties, such as between vendors and consumers to arrange or perform some element of a commerce transaction. In one such example, an auction listing enables the user to contact the seller to ask questions regarding the item for sale via the party communication module, which in further embodiments is able to anonymously forward messages so that actual e-mail, telephone, or other direct contact information is not directly available to other network commerce system users.

In this example, the party communication module 208 also facilitates communication between parties offering merchandise in alternate formats, such as a pay-per-lead listing format, in which the party having an item for sale pays for leads meeting certain criteria in addition to or instead of paying for other services. In one such example, the party communications module facilitates and tracks communication between parties, so that tracked communication can be used to qualify a lead and charge the pay-per-lead format fee to the seller.

Figure 3:
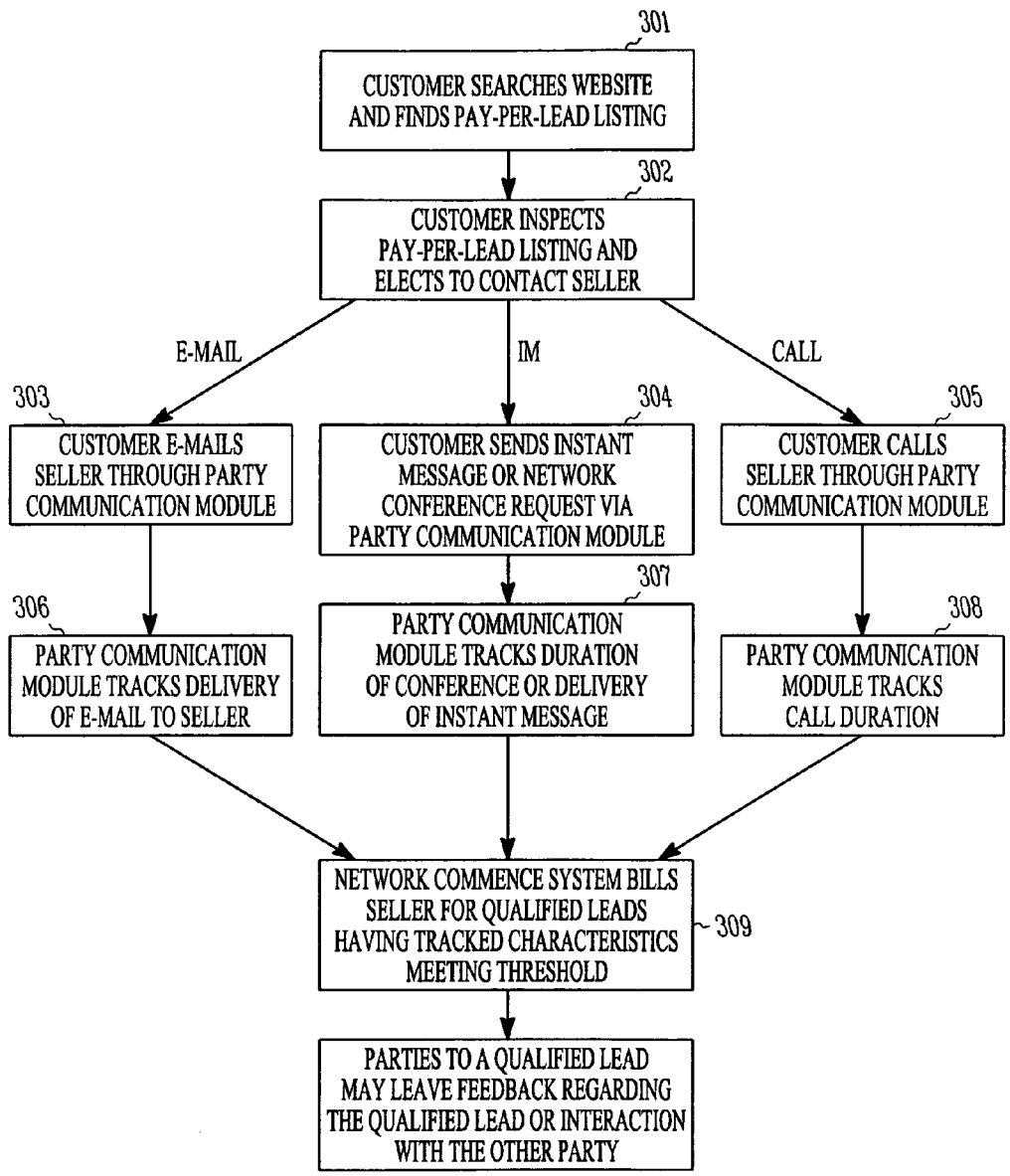
FIG. 3 is a flowchart, illustrating an example method of practicing the present invention.

Following the flowchart of FIG. 3, a user of a network commerce site such as an online auction site performs a search or browses listings of items meeting certain criteria. The pay-per-lead listing has already been created and posted, and the lister has agreed to pay a certain fee for leads referred to the seller that meet certain criteria. Here, a keyword search on an auction site turns up auction results, plus a number of pay-per-lead listings including information regarding the product for sale, such as price, specifications, condition, or other relevant information. The customer selects a pay-per-lead listing, and reads it more carefully at 302, determining that the product meets his needs. The customer then elects to contact the seller, such as by sending an e-mail, placing a call, or initiating an online instant message or conference session via the party communication module. Any other method of communication can also be adapted for use via the party communication module, such as providing a traditional mail address, providing a phone number and contact information, or providing other requested seller contact information.

Here, the third party vendor or seller is contacted through one of three different mechanisms; through e-mail at 303, through instant message or network conference at 304, or through a phone call at 305. At 303, the interested customer sends an e-mail to the pay-per-listing third party seller, such as by using a form provided by the network commerce provider or by sending an e-mail using his own e-mail account to a forwarding service provided as part of the party communications module service, which is then forwarded to the appropriate third party vendor after tracking the e-mail. In either event, the sent e-mail is tracked by the party communications module at 306, or the revealed third party vendor e-mail address is tracked by the party communications module. The tracked information regarding forwarding or delivery of the e-mail message or e-mail address is used along with various rules regarding what constitutes a qualified lead to bill the third party vendor for qualified leads provided. For example, if an e-mail message must be received in the party communications module and forwarded to an e-mail account associated with the third party vendor to constitute a qualified lead, the party communications module tracks e-mail forwarded from potential customers to the third-party vendors via the pay-per-lead listing.

In another example, the prospective customer uses online communications services such as an instant messaging service, a network conference such as a videoconference or chat window, or another network service to establish communication with the seller. The customer in one such example uses contact information provided as a part of the pay-per-lead listing to contact the seller via the party communications module, such that the party communications module is able to track contact between parties. If the contact meets certain qualifying criteria, such as delivery of an instant message or a videoconference that lasts ten seconds or more, the contact between the customer and third party vendor is deemed to be a qualified lead and the seller is charged for the provided lead.

In a third example, the customer uses a phone service, such as using a network telephone to contact the seller. In other examples, the network commerce site is accessed via a cell phone, personal digital assistant, or other device having cellular or other phone capability, and the phone device is used to contact the seller. Alternatively, a direct-dial telephone number provided by the pay-per-lead vendor is provided to the customer, and providing the contact information is tracked as a qualifying event for charging the seller for a qualified lead. In a further example, the phone service or telephone number provided to the consumer is managed or provided by the network commerce system, such that the network commerce system is able to redirect the call to the seller and track communication between the consumer and seller or service provider.

The network commerce system then bills the seller or third party vendor for the leads generated through the pay-per-lead listings, such as through transaction accounting module 205 of FIG. 2. Such a system facilitates tracking and billing in a pay-per-lead system, and provides tracking of qualified leads in the party communication module. The parties to a transaction that is a part of or results from a qualified lead are then able to leave feedback regarding the transaction, or in some embodiments regarding a transaction that is not completed but failed to complete after a lead was qualified.

The feedback module at 207 allows users to provide feedback, which becomes a part of a feedback record for various parties in the network commerce system. Other users can view the feedback left for a particular user, whether in detail or in summary, so that the reliability of the party in question can be gauged as a potential party to a commerce transaction. The feedback record of a typical transaction-based online system, such as an online auction system or other commerce system, provides the parties involved in a transaction the opportunity to leave feedback for one another when the transaction is completed. For example, the winning bidder and seller in an auction are both able to leave feedback regarding conclusion of the auction transaction, such as regarding shipping, packaging, accuracy of the description of the item for sale, and any other such information so that parties conducting transactions with either of the two parties in the future can rely on the history and good reputation of a party with favorable feedback, or be cautious if a party has very little or poor feedback.

But, such feedback methods are not useful where there is no completed transaction evident in the system, such as in a pay-per-lead or a click-to-call listing format. Because the lead or call takes place in some embodiments outside the scope of the listing system, one embodiment of the invention includes providing parties in a pay-per-lead or click-to-call type listing the ability to leave feedback for one another regarding a transaction or potential transaction once the call or other communication is sufficient to constitute a qualified lead.

Returning to the example of FIG. 1, once some minimum level of communication between the third-party vendor and the potential customer is achieved, a lead is determined to be qualified and feedback regarding whatever transpires as a result of the qualified lead is enabled. In some examples, the customer sends an e-mail to the third-party vendor via an interface or e-mail system provided by the network commerce system provider, or sends a text message, voice message, or initiate an online teleconference with the vendor to establish a qualified lead. In other examples, the customer uses a system provided by the network commerce system provider to initiate contact with the third-party vendor, such that the contact can be characterized or tracked by the network commerce provider.

In one specific click-to-call example, an online teleconference that is initiated but that is not received or that does not contain any content will not be recognized as a qualified lead in some embodiments, and no feedback may be left regarding the failed attempt to initiate contact. In other embodiments, the duration of the teleconference or videoconference must be a minimum length, such as five or ten seconds, for the lead to constitute a qualified lead and for feedback to be left. Similarly, where contact between a potential customer and a third-party vendor takes another form such as e-mail, the content, delivery, and length of the e-mail can be used to determine whether the lead is a qualified lead and whether feedback is made available to the customer and vendor. For example, an e-mail message that has no content, or that contains fewer than ten characters, may be ignored and not considered a qualified lead. Similarly, when an e-mail cannot be delivered, does not contain appropriate customer contact information, or is from the same potential customer as another qualified lead, the lead can be ignored as a lead that is not qualified for payment on a pay-per-lead basis, and feedback is not enabled.

These examples illustrate how a pay-per-lead online commerce system, including listings such as a click-to-call and other lead-based transactions where a prospective customer contacts a third party vendor and completes part of the transaction outside the online commerce system can use various rules for qualifying leads to enable feedback for the prospective customer and third-party vendor. Although certain examples shown and described here, other variations exist and are within the scope of the invention. It will be appreciated by those of ordinary skill in the art that any arrangement which is designed or arranged to achieve the same purpose may be substituted for the specific embodiments shown. This application is intended to cover any adaptations or variations of the example embodiments of the invention described herein. It is intended that this invention be limited only by the claims, and the full scope of equivalents thereof.

Figure 4:
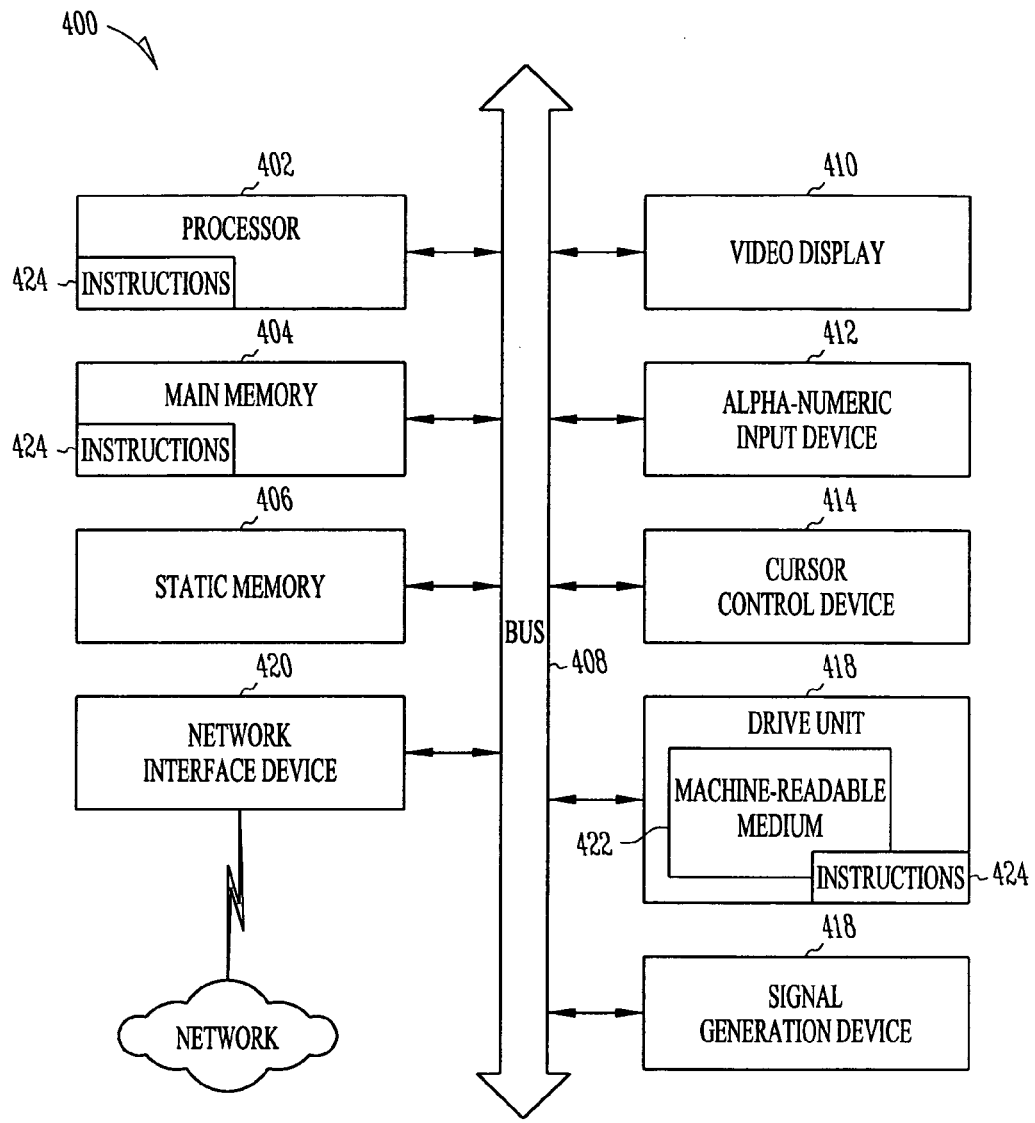
FIG. 4 is a block diagram of a computer system and a machine readable medium, as may be used to implement some embodiments of the invention.

FIG. 4 is a block diagram of machine in the example form of a computer system 400 within which a set of instructions, for causing the machine to perform any one or more of the methods discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a user interface (UI) navigation device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420 utilizing any one of a number of well-known transfer protocols (e.g., HTTP). Certain applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information).

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system, comprising:
 a processor;
 a memory;
 a product sale listing searchable by a consumer and comprising one or more products or services provided by a third-party vendor;
 a product sale listing provisioning module operable to provide one or more product sale listings for presentation to the consumer;
 a pay-per-lead tracking module operable to track consumer leads provided to the third-party vendor, at least one of the consumer leads generated from a selection by the consumer of a product sale listing, the consumer leads comprising leads for sale of the one or more products or services provided by the third-party vendor, each consumer lead that meets one or more quality standards being designated as a qualified lead and having an associated payment due irrespective of a sale transaction, wherein the qualified lead comprises at least a threshold level of communication between the consumer and the third party vendor, the threshold level being greater than zero, the tracking performed by a hardware processor; and
 a feedback system operable to enable at least one of the consumer and the third-party vendor to leave feedback regarding a lead tracked via the pay-per-lead tracking module.

2. The system of claim 1, wherein the pay-per-lead tracking module is further configured to bill the third party vendor for tracked consumer leads.

3. The system of claim 1, wherein the pay-per-lead tracking module is to track qualified consumer leads.

4. The system of claim 1, wherein the at least a threshold level of communication comprises at least one of an e-mail message, a text message, a voice call, or a video call.

5. The system of claim 1, wherein the at least a threshold level of communication comprises communication of at least a minimum size or duration.

6. The system of claim 3, wherein feedback may be left only for qualified consumer leads.

7. The system of claim 1, wherein feedback may be left only after a transaction resulting from the tracked lead has been completed.

8. The system of claim 1, wherein feedback may be left only after a transaction resulting from the tracked lead results in a sale agreement.

9. A method of facilitating a transaction between a consumer and a third-party vendor, comprising:
 searching for a product sale listing based on a query from a user;
 providing one or more product sale listings for presentation to the user, at least one of the product sale listings comprising one or more products or services provided by a third-party vendor;
 tracking consumer leads provided to the third-party vendor in a pay-per-lead tracking module, at least one of the consumer leads generated from a selection by the user of a product sale listing, the consumer leads comprising leads for sale of the one or more products or services provided by the third-party vendor, each consumer lead that meets one or more quality standards being designated as a qualified lead and having an associated payment due irrespective of a sale transaction, wherein the qualified lead comprises at least a threshold level of communication between the consumer and the third party vendor, the threshold level being greater than zero, the tracking performed by a hardware processor; and
 receiving feedback from at least one of the consumer and the third party vendor regarding a lead tracked via the pay-per-lead tracking module.

10. The method of facilitating a transaction between a consumer and a third-party vendor of claim 9, further comprising billing the third party vendor for tracked consumer leads.

11. The method of facilitating a transaction between a consumer and a third-party vendor of claim 9, wherein the pay-per-lead tracking module is operable to track qualified consumer leads.

12. The method of facilitating a transaction between a consumer and a third-party vendor of claim 9, wherein the method is performed in a network server.

13. The method of facilitating a transaction between a consumer and a third-party vendor of claim 12, wherein feedback may be left only for qualified consumer leads.

14. The method of facilitating a transaction between a consumer and a third-party vendor of claim 9, wherein the at least a threshold level of communication comprises at least one of an e-mail message, a text message, a voice call, or a video call.

15. The method of facilitating a transaction between a consumer and a third-party vendor of claim 9, wherein the at least a threshold level of communication comprises communication of at least a minimum size or duration.

16. The method of facilitating a transaction between a consumer and a third-party vendor of claim 9, wherein feedback may be left only after a transaction resulting from the tracked lead has been completed.

17. The method of facilitating a transaction between a consumer and a third-party vendor of claim 9, wherein feedback may be left only after a transaction resulting from the tracked lead results in a sale agreement.

18. A non-transitory machine-readable medium with instructions stored thereon, the instructions when executed operable to cause a computerized system to:
 search for a product sale listing based on a query from a user;

provide one or more product sale listings for presentation to the user, at least one of the product sale listings comprising one or more products or services provided by a third-party vendor;

track consumer leads provided to the third-party vendor in a pay-per-lead tracking module, at least one of the consumer leads generated from a selection by the user of a product sale listing, the consumer leads comprising leads for sale of the one or more products or services provided by the third-party vendor, each consumer lead that meets one or more quality standards being designated as a qualified lead and having an associated payment due irrespective of a sale transaction, wherein the qualified lead comprises at least a threshold level of communication between the consumer and the third party vendor, the threshold level being greater than zero; and receive feedback from at least one of the consumer and the third party vendor regarding a lead tracked via the pay-per-lead tracking module.

19. The machine-readable medium of claim 18, the instructions when executed further operable to bill the third party vendor for tracked consumer leads.

20. The machine-readable medium of claim 18, wherein the pay-per-lead tracking module is operable to track qualified consumer leads.

21. The machine-readable medium of claim 20, wherein feedback may be left only for qualified consumer leads.

22. A non-transitory, hardware data structure, comprising:
a first set of data comprising identities of parties to a network commerce system, the parties including third party vendors providing sale listings in a pay-per-lead format; and a second set of data associated with the first set of data and comprising feedback associated with leads provided to the third party vendors, at least one of the leads generated from a selection by a user of a product sale listing, the leads comprising leads for sale of the one or more products or services provided by the third-party vendor, each lead that meets one or more quality standards being designated as a qualified lead and having an associated payment due irrespective of a sale transaction, wherein the qualified lead comprises at least a threshold level of communication between the consumer and the third party vendor, the threshold level being greater than zero.

23. The data structure of claim 22, further comprising a third set of data associated with the first set of data and comprising leads provided to third party vendors for which feedback may be left.

24. The data structure of claim 23, further comprising a third set of data associated with the first set of data and comprising qualified leads provided to third party vendors for which feedback may be left.

* * * * *